Dec. 5, 1972  YOSHIMI SHINOHARA  3,705,078
REGULATING PULP CONCENTRATION IN PAPER MANUFACTURING
Filed Sept. 8, 1970
4 Sheets-Sheet 1
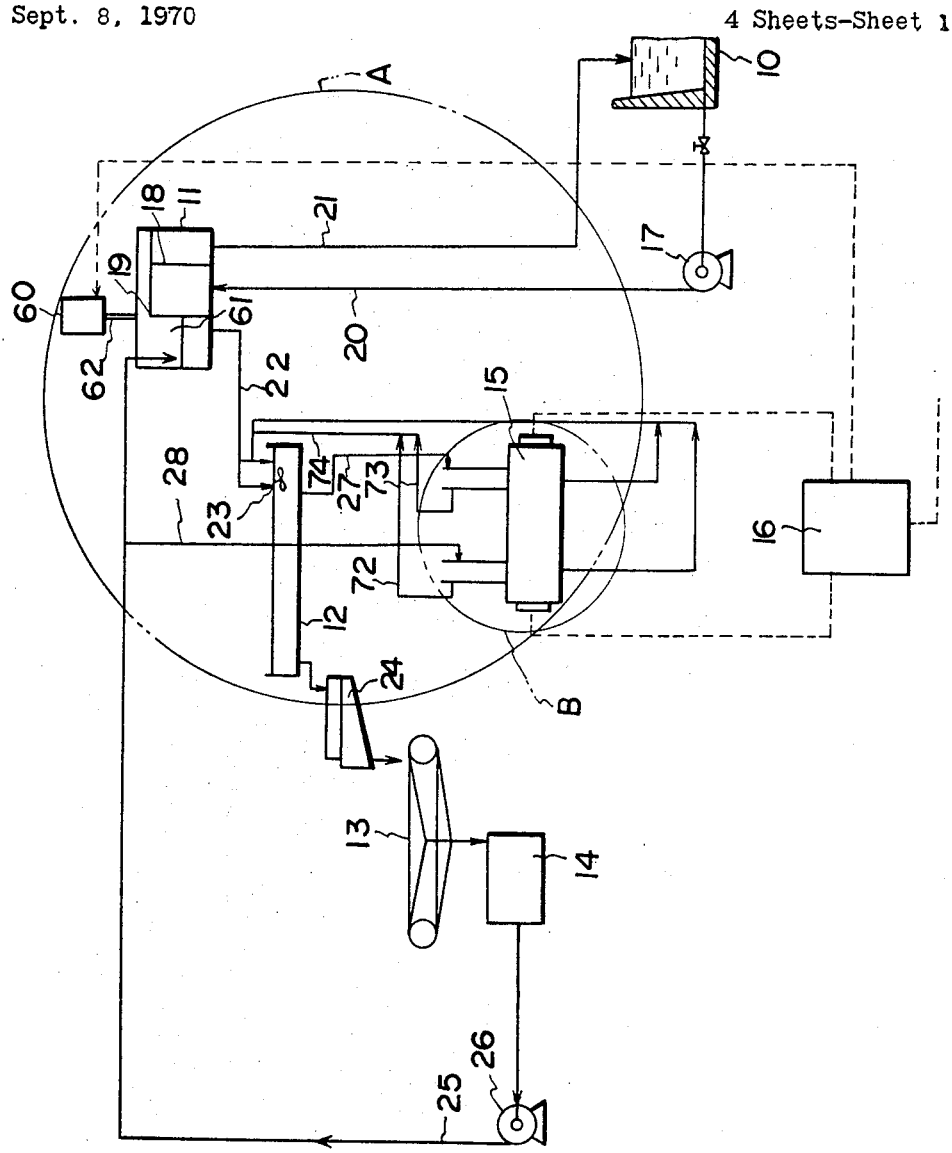
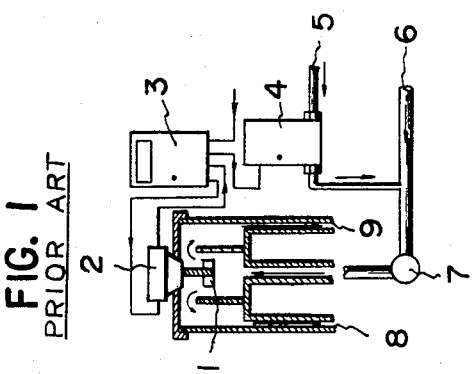
INVENTOR
YOSHIMA SHINOHARA
BY
Steinberg and Blake
ATTORNEYS

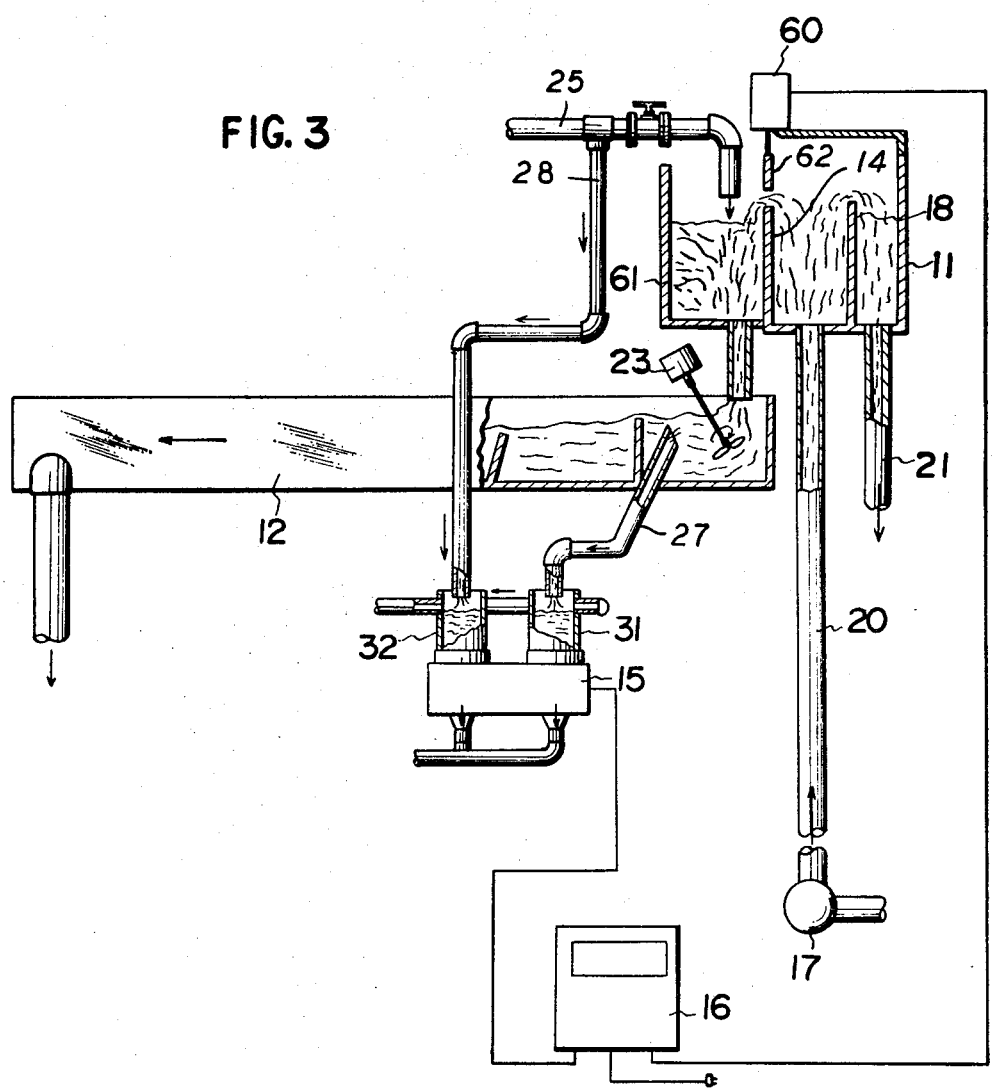

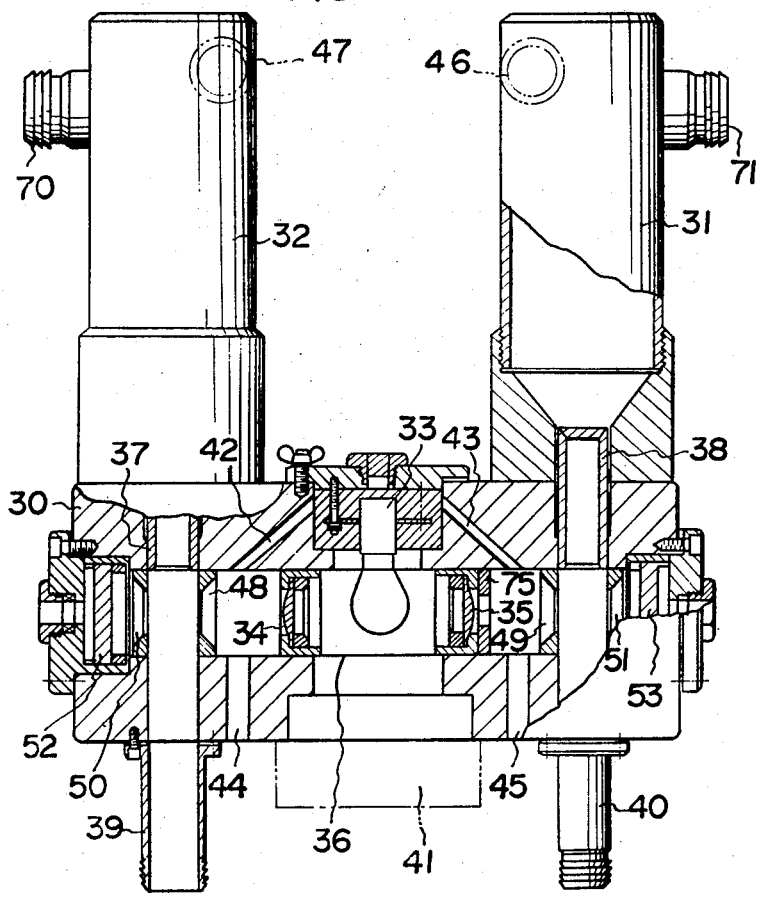

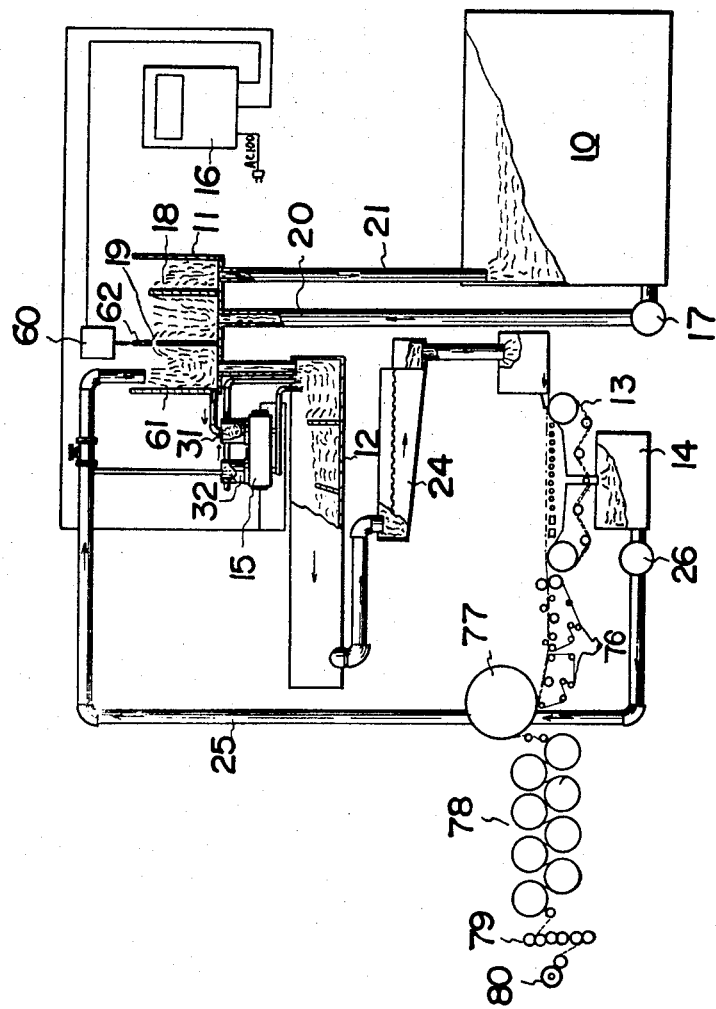

United States Patent Office 3,705,078
Patented Dec. 5, 1972

3,705,078
REGULATING PULP CONCENTRATION IN
PAPER MANUFACTURING
Yoshimi Shinohara, 493–2 Kuzawa, Fuji-shi,
Shizuoka-ken, Japan
Filed Sept. 8, 1970, Ser. No. 70,423
Claims priority, application Japan, Sept. 6, 1969,
44/70,465
Int. Cl. D21f 1/06, 1/08
U.S. Cl. 162—198
10 Claims

ABSTRACT OF THE DISCLOSURE

The regulation of pulp concentration in the manufacture of paper. A carrier liquid is continuously recirculated and carries the pulp from which the paper is manufactured. A replenishing liquid is added to the carrier liquid for replenishing the pulp thereof. A comparison is made between the carrier liquid before the replenishing liquid is added thereto and the carrier liquid after the replenishing liquid is added thereto. By way of this comparison, a detecting assembly detects the deviation, if any, of the relationship between the carrier liquid without replenishing liquid and the carrier liquid with replenishing liquid added thereto from a predetermined relationship therebetween. In accordance with the detected deviation, if any, an electrical signal is achieved for electrically adjusting a valve which controls the supply of replenishing liquid to the carrier liquid, and in this way the supply of replenishing liquid to carrier liquid is maintained at an extent which will maintain the predetermined relationship between the carrier liquid without replenishing liquid and the carrier liquid with replenishing liquid added thereto.

BACKGROUND OF THE INVENTION

The present invention relates to the manufacture of paper.

In particular, the present invention relates to a method and apparatus for regulating the concentration of pulp in a carrier liquid from which the pulp is removed during the manufacture of paper.

As is well known, during the manufacture of paper it is important to maintain a given concentration of pulp in a carrier liquid which is circulated during the manufacture of the paper. Various methods and devices are already known for this purpose. For example, it is known to provide a device which detects the resistance to flow of the liquid with the pulp therein, so that theoretically this resistance to flow will be determined according to the concentration of pulp, for achieving in this way a signal for a suitable control. However, such known devices and methods result only in regulations which are extremely coarse, preventing a precise regulation from being achieved and thus preventing a uniform high-quality product from being achieved. Thus, with devices of this latter type the rate of flow variation of the pulp-carrying liquid cannot be adjusted to a concentration within a range below 2% because the liquid itself provides a resistance of this latter extent without any considerations of the pulp content thereof. Furthermore, during operations it sometimes happens that certain events occur to provide sudden, unexpected changes in the concentration, and the known methods and apparatus under these conditions cannot respond for providing a proper regulation. For example if the endless screen through which the liquid falls to leave the pulp deposited on the screen should happen to break at any point, there will be a sudden addition of pulp to the carrier liquid, and the known methods and apparatus cannot respond to occurrences of this nature.

Furthermore, the known methods and apparatus require an undesirably large number of attendants to watch over the operation of the apparatus, and they are incapable of achieving an output which is as high as desired while at the same time maintaining a quality as high as desired.

SUMMARY OF THE INVENTION

It is accordingly a primary object of the present invention to provide a method and apparatus which will avoid the above drawbacks.

In particular, it is an object of the invention to provide an apparatus which will operate automatically to maintain the pulp in the carrier liquid at a given concentration, so that the number of attendants can be maintained at a minimum, thus reducing labor costs.

Furthermore it is an object of the present invention to provide a method and apparatus which operates continuously as well as automatically to maintain the required concentration of pulp in the carrier liquid, in a manner achieving an extremely high output while also achieving an extremely high quality in the product.

It is furthermore an object of the present invention to provide regulation of the concentration of pulp in the carrier liquid in a highly accurate manner capable of maintaining the concentration at a desired value within extremely small limits where the deviation, if any, from the predetermined concentration are of no significance and occur only temporarily for times of extremely short duration due to the rapid return of the carrier liquid to the required predetermined concentration.

According to the invention the carrier liquid, from which the pulp is taken to manufacture the paper, is continuously recirculated while a replenishing liquid is continuously added thereto for replenishing the pulp. A comparison is made between the carrier liquid before replenishing liquid is added thereto and the carrier liquid after replenishing liquid is added thereto, and in accordance with this comparison the deviation, if any, of the relationship between the carrier liquid alone and the carrier liquid with added replenishing liquid from a predetermined relationship is detected. In accordance with the detected deviation the rate of supply of replenishing liquid to carrier liquid is regulated for maintaining the latter predetermined relationship. The detecting of the latter deviation, if any, is brought about by directing a pair of controlled light beams through a pair of streams which are completely exposed and unobstructed with one of the streams being the carrier liquid without replenishing liquid and the other of the streams being the carrier liquid with replenishing liquid added thereto. These light beams, after they pass through the streams, respectively, impinge on light-responsive components from which an electrical signal is achieved for providing in accordance with the deviation of this signal from a predetermined signal an automatic control of a valve which regulates the supply of replenishing liquid to carrier liquid.

BRIEF DESCRIPTION OF DRAWINGS

The invention is illustrated by way of example in the accompanying drawings which form part of this application and in which:

FIG. 1 is a schematic representation of a known prior-art device;

FIG. 2 is a schematic representation of that part of a paper-manufacturing apparatus which is provided with the structure of the invention and which carries out the method of the invention;

FIG. 3 is a schematic partly sectional elevation fragmentarily illustrating that part of FIG. 2 which is contained within the dot-dash line circle A;

FIG. 4 is a sectional partly schematic elevation of that part of the structure of FIG. 2 which is contained within the dot-dash line circle B; and FIG. 5 is a schematic representation of a further embodiment of the method and apparatus of the invention.

DESCRIPTION OF PREFERRED EMBODIMENTS

Referring first to FIG. 1, there is illustrated therein a known arrangement demonstrating the problems which are overcome by the present invention. Thus, referring to FIG. 1, the carrier liquid, from which pulp has been removed during the manufacture of paper, flows along the pipe 6 to a pump 7 to be delivered thereby to the overflow chamber having a pair of walls between which a rotary paddle device 1 is located. The liquid rotates the rotary member 1 so as to provide at the component 2 a signal transmitted to a control 3 which in turn regulates a valve 4. The overflowing liquid returns through the conduits 8 and 9 to the circulated carrier liquid. The replenishing liquid is supplied through the supply pipe 5, and the valve 4 controls the rate of supply of replenishing liquid to the carrier liquid. In accordance with the resistance to flow of the carrier liquid and the replenishing liquid added thereto, as detected by the rotary impeller 1 driven by the liquid itself, a signal is transmitted to the control 3 and the valve 4 in order to attempt to maintain the concentration constant. However, in view of the difficulties referred to above, an accurate control cannot be maintained with this construction, resulting in a product of poor quality.

Referring now to FIG. 2, there is illustrated at the lower right thereof, in a fragmentary manner, a tank 10 which contains a supply of replenishing liquid which carries pulp at a relatively high concentration of approximately 3%. The box 11 forms a supply means for supplying replenishing liquid to the carrier liquid from which the pulp is taken for manufacturing the paper. The supply means 11 communicates with a circulating means which continuously circulates the carrier liquid, the circulating means including the pipe 25 which delivers to the box 11 carrier liquid from which the pulp has already been removed. The circulating means includes a pipe 22 which receives from the box 11 the carrier liquid with the replenishing liquid added thereto, and the liquid is delivered to a unit 12 in which this liquid is beaten, as by a suitable rotary beater 23, so as to achieve a uniformity in the liquid. Then the liquid passes through a screen-mesh 24, forming a filter, and from the filter 24 the liquid is deposited on a rotary screen-mesh 13 in the form of an endless belt from which the liquid drops into a receiving tank 14 while the pulp remains on the screen to be subsequently treated for forming the finished paper product in a well known manner.

In accordance with the invention a detecting means 15 is provided for comparing the difference between the carrier liquid before replenishing liquid is added thereto and the carrier liquid after the replenishing liquid is added thereto. For this purpose a conduit means 28 communicates with the circulating conduit 25 upstream of the supply means 18 for delivering to the detecting means 15 carrier liquid which does not have any replenishing liquid added thereto. A second conduit means 27 communicates with the circulating means, which includes the unit 12, downstream of the supply means 11 for supplying to the detecting means 15 the carrier liquid to which the replenishing liquid has been added. In the detecting means these liquids are compared so as to detect the deviation, if any, from a predetermined relationship between the carrier liquid without replenishing liquid and the carrier liquid with replenishing liquid added thereto. A control means 16 receives the signal from the detecting means 15 and transmits the signal, as schematically represented by the dotted line in FIG. 2 to a mechanism 60 which acts on a valve 62 for controlling the supply of replenishing liquid to carrier liquid. The highly concentrated replenishing liquid, having a concentration of approximately 3% of pulp, as pointed out above, is taken from the tank 10 by a pump 17 and delivered to a conduit 20 into the supply means formed by the box 11 between a pair of vertical partitions 18 and 19, and the liquid flows over the top edge of the partition 18 to return by the conduit 21 back to the tank 10 while the replenishing liquid flows also over the partition 19 to be added to the carrier liquid in the chamber 61 to which the carrier liquid is delivered by the conduit 25. The valve 62 is in the form of a gate valve member having its distance from the top edge of the wall 19 regulated by the mechanism 60 so that the gap between valve member 62 and the top edge of wall 19 is controlled for controlling the rate of supply of replenishing liquid to carrier liquid.

The highly concentrated replenishing liquid is diluted with the much larger amount of carrier liquid, the amount of which may be several tens of times larger than the amount of replenishing liquid, and in the unit 12 the combined carrier liquid and replenishing liquid are treated to have a highly smooth liquid delivered to the screen 13. In the unit 12 pebbles, sand, dust and other foreign bodies, rubbish and the like are precipitated and removed. Thus, the purified and uniform pulp liquid is deposited onto the continuously moving endless belt in the form of screen 13 after passing through the filter 24, and the pulp deposited on the screen 13 will then be dried with the separated carrier liquid being received in the tank 14.

From the tank 14 a pump 26 serves to continuously pump out of the latter and along the pipe 25 a fixed amount of carrier liquid so that a predetermined quantity of carrier liquid is continuously delivered to the supply means 11 by the circulating means which includes not only the pump 26 but also the conduit 25, the chamber 61, the conduit 22, and of course the unit 12, the screen 24, and the tank 14. Thus, the carrier liquid is continuously recirculated and continuously supplied with replenishing liquid.

The carrier liquid is continuously circulated so as to repeatedly pass through the operating cycles, continuously having fresh pulp added thereto from the replenishing liquid and continuously having sediment, clay, such as white clay, and other impurities removed, so that the requirement of dyeing agents, pulp, chemicals, pure water and the like are curtailed, thus improving the productivity. In order to manufacture colored paper, the carrier water is properly colored.

As is apparent from the above description, according to the present invention a comparison is made between the carrier liquid before replenishing liquid is added thereto and the carrier liquid after replenishing liquid is added thereto, so as to achieve from this comparison a suitable control for maintaining a constant concentration of pulp in the carrier liquid when the carrier liquid is deposited on the screen 13.

Referring to FIG. 3 it will be seen that many of the details referred to above are illustrated therein. Thus, FIG. 3 shows how the replenishing liquid overflows the wall 18 to return through the conduit 21 to the tank 10, and it also illustrates how the mechanism 60 is controlled from the control means 16 so as to control the position of the valve means 62 and thus control the rate of supply of replenishing liquid to the carrier liquid in the chamber 61 from which the liquid flows into the unit 12. Also FIG. 3 illustrates how the conduit 28 supplies the carrier liquid, before replenishing liquid is added thereto, to a receiving chamber 32 of the detecting means 15, while the carrier liquid with the replenishing liquid added thereto is supplied through the conduit 27 to the receiving chamber 31 of the detecting means 15.

This latter structure of FIG. 3 is enclosed within the large circle A of FIG. 2. FIG. 4 shows in greater detail the structure enclosed within the circle B of FIG. 2. Referring to FIG. 4, the detector means 15 includes an outer housing 30 carrying the receiving chambers 32 and 31 for the carrier liquid without and with the replenishing liquid, as referred to above in connection with FIG. 3. The receiving chamber 31 communicates with a conduit 38 from which the stream of carrier liquid with replenishing liquid added thereto drops across the interior of the horizontal tubular housing 30 to be received by the conduit 40. In the same way the carrier liquid without replenishing liquid flows from the chamber 32 downwardly through a conduit 37 and then across the hollow interior of the housing 30 to be received in a conduit 39. From these conduits 39 and 40 the pair of liquid streams are returned back to the unit 12, in the manner illustrated in FIG. 2. Thus, there is provided for the structure of the invention a pair of conduit means one of which includes the conduit 28 having an inlet end for receiving carrier liquid upstream of the supply means 11 before replenishing liquid is added thereto and the other of which includes the conduit 27 for receiving carrier liquid downstream of the supply means 11 after replenishing liquid is added thereto. This pair of conduit means serves to direct across the interior of the housing 30 of the detecting means a pair of streams respectively received by the portions 39 and 40 of the pair of conduit means. The left stream of FIG. 4 will of course be the carrier liquid without replenishing liquid, and when flowing across the interior of the housing 30 this stream is completely exposed and out of contact with any other components, and the same is true of the stream which falls across the interior of the housing 30 from the conduit 39 to the conduit 40 which form part of the other of the conduit means which serves to form a free, completely exposed, unobstructed stream of the carrier liquid with replenishing liquid in the interior of the housing 30.

The detecting means of the invention directs through these streams which are completely exposed and unobstructed a pair of controlled light beams which are derived from a common light source 33. The light beams are controlled by lenses 34 and 35 so as to be concentrated and directed horizontally through the vertically falling streams. The housing 30 is formed with cooling passages 42–45, and a fan 41 communicates through an opening 36 with the chamber where the lamp 33 is located, so that cooling air can be circulated through the detecting means. Situated adjacent the streams of liquid are apertured components 48 and 50 for the stream of carrier liquid without replenishing liquid and 49 and 51 for the stream of carrier liquid which has the replenishing liquid added thereto. These are simply apertured bodies compelling the light beams to take the form of narrow slits so that undesired influence on the light beams themselves by the liquid streams can be avoided. A mechanism 75 is provided for blocking the beam of light which flows from the source 33 through the stream of carrier liquid which has replenishing liquid added thereto, and this mechanism 75 takes the form of an iris mechanism, which may be a simple iris diaphragm or shutter component as well known, capable of being adjusted so as to control the size of the aperture through which the light from the lamp 30 can travel.

The pair of light beams are received by a pair of light-responsive components 52 and 53 which in the illustrated example take the form of solar batteries capable of responding to the light to generate voltages the magnitudes of which can be detected in accordance with the light received from the source 33 after having passed through the pair of streams. If desired, however, these components 52 and 53 may take the form of photoelectric elements or variable resistors connected into a suitable circuit and having a resistance which varies with light intensity, as is well known in photography.

It is important to note in connection with these details of the detecting means shown in FIG. 4 that the light which passes through the pair of streams does not have to also pass through any glass or other transparent tubular enclosure through which the fluid flows, so that the light is not influenced in an uncontrollable manner by passing first through a transparent enclosure for the streams. The freely falling streams are completely exposed and fully accessible to the light which passes directly therethrough so that the influence in the light beams is derived solely from the condition of the liquid streams and not from any other source.

As is apparent from the above description, the voltage generated by the solar batteries will vary according to the concentration of the flowing liquid, and this voltage is detected through amplifiers at the control means 16. This control means is set so that in accordance with the setting of the iris mechanism 75 a certain balance will be achieved when the relationship between the carrier liquid without replenishing liquid and the carrier liquid with replenishing liquid is a predetermined relationship. In other words it is this latter relationship at which equilibrium conditions are achieved with the replenishing liquid supplying to the carrier liquid exactly the amount of pulp which is continuously removed from the carrier liquid during the manufacture of the paper. Assuming that there is no deviation from this relationship corresponding to these equilibrium conditions, then of course there will be balance and the control means 16 will not transmit any signal to the valve means 60, 62. On the other hand, if a deviation from the predetermined relationship is detected, then the control means 16 will respond and will transmit a corresponding signal to the valve means 60, 62 actuating the latter automatically to open or close the passage over the top edge of the wall 19 to an extent which will maintain the concentration of pulp constant. Thus, when there is a deviation from the equilibrium conditions the amount of light passing through the carrier liquid without replenishing liquid, on the one hand, and the carrier liquid with replenishing liquid, on the other hand, will have with respect to each other a certain differential value which will provide the required signal. Thus the detecting system described above and shown in the drawings is a 0-phase system and electrical output is balanced under equilibrium conditions in accordance with the setting of the iris mechanism 75. This mechanism can be adjusted so as to change the equilibrium conditions as required. Thus, when equilibrium conditions are achieved the iris mechanism 75 is set so as to provide a zero signal where balance is achieved, and then any deviation from these conditions will provide the required signal for increasing or decreasing the rate of supply of replenishing liquid to the carrier liquid.

Considering a specific example, if both batteries provide voltages of 0.2 v., then the control means 16 will detect no deviation and a signal will not be transmitted and the conditions will be maintained at equilibrium. On the other hand, if too much pulp is being added by way of the replenishing liquid, then, in this case the solar battery 53 may generate a voltage of 0.15 v. while the solar battery 52 will generate a voltage of 0.2 v., so that there is a deviation of 0.05 v. in a direction indicating that the supply of replenishing liquid is to be reduced. Of course, with the reverse conditions where there is an insufficient amount of pulp being added by way of replenishing liquid, the signal will be reversed to achieve an opening of the valve means 60, 62 to an extent which will increase the pulp concentration so as to reestablish the equilibrium conditions. Thus with this specific example the control means 16 detects the voltage variation according to the change in the degree of concentration, thereby enabling an accurate measurement of concentration to be made and further automatically adjusting the concentration by control of the valve means.

If it should happen that there is a certain increase in the concentration of the carrier liquid, as for example if the endless screen belt 13 should break so that a considerable amount of pulp accidentally is added to the carrier liquid in the tank 14, then this concentration will provide a control which will automatically close the valve means 60, 62 to an extent reducing the addition of pulp by way of the replenishing liquid until the equilibrium conditions are again achieved. Thus in this case the concentration of the carrier liquid without added replenishing liquid increases, thus decreasing the amount of light received by the battery 52 so that the voltage generated thereby diminishes by an extent which when compared with the voltage generated by the solar battery 53 will provide the required control in a fully automatic manner. Of course, the carrier liquid will have not only pulp but also chemical agents, dyeing agents, etc., but these will be equalized in a pair of streams which flow through the detecting means to have the light beams therethrough. Thus, in the manner described above the method and apparatus of the invention will achieve an extremely precise uniformity in the concentration of pulp in the carrier liquid.

With the particular embodiment of the invention which is illustrated in FIG. 4, the light-directing members 48, 50, 49, 51 provide a narrow rectangular slit of light which is not influenced by the movement of the liquid itself. Thus undesirable flickering is prevented and extremely precise results are achieved. Of course, the structure described above provides for equal rates of flow of the streams across the open space in the interior of the housing 30 of the detecting means, so that there is no inaccuracy resulting from any difference in the rates of flow in the streams. Furthermore, the pair of light beams are derived from a common source and are acted upon by equal lenses as well as light-directing structures so that there is no inaccuracy resulting from any difference in a manner in which the light is transmitted to the light-responsive components 52 and 53. Naturally the iris mechanism 75 is an adjustment which is independently introduced so as to achieve the required balance which will result in equilibrium conditions as pointed out above.

The fan 41 will reliably prevent any fogging of the lenses due to vaporization of liquid resulting from the heat which may be generated from the lamp 33.

Referring to FIG. 4, the connections 70 and 71 respectively form the connections to the conduits 72 and 73 as shown in FIG. 2 for returning excess liquid from the chambers 32 and 31 respectively to the return flow conduit 74 which reestablishes the communication of the conduit means 28, 27 with the circulating means upstream of the detecting means 15. Downstream of the detecting means the pair of conduits 39 and 40 reestablish communication with the conduit means 22 in the manner shown schematically in FIG. 2. Thus all of the liquid used for detecting the deviation, if any, from the predetermined relationship between the carrier liquid with replenishing liquid and the carrier liquid without replenishing liquid is returned back to the unit 12 to continue to flow through the circulating means.

In the embodiment of the invention which is illustrated in FIG. 5, all of the components which correspond to those referred to above are designated by the same reference characters and they all function in the same way. The primary difference between the embodiment of FIG. 5 and that of FIGS. 2-4 resides in the fact that the detecting means 15 receives the carrier liquid to which the replenishing liquid has been added directly from the chamber 61 of the supply means 11, so that the detecting means acts on the carrier liquid to which the replenishing liquid has been added before this latter liquid has reached unit 12. With this embodiment the fluid discharging through the conduits 39 and 40 flows directly into the unit 12 instead of being returned thereto through a separate conduit as was the case with the embodiment of FIGS. 2-4. Otherwise the embodiment of FIG. 5 operates in the same way as that of FIGS. 2-4.

FIG. 5 shows, however, in addition to the endless screen belt 13 additional conventional components such as the drier 77, the further drying rollers 78, the calender roller assembly 79, and the take-up roller 80.

As is apparent from the above description, the method and apparatus of the present invention provides a number of advantages as follows:

(1) The carrier liquid is continuously circulated, thus making an extremely effective and economical use of dyeing agents, water, chemicals, etc.

(2) The mixture composed of the replenishing liquid and the carrier liquid is compared with the carrier liquid without the replenishing liquid, so that the latter carrier liquid acts as a standard of comparison, and in this way an extremely accurate adjustment of concentration is achieved in a fully automatic manner by maintaining the difference in the concentrations of the carrier liquid without replenishing liquid and carrier liquid with replenishing liquid at a certain predetermined relationship.

(3) The detector means provides a highly stable operation of extremely high accuracy because of the zero balancing method which eliminates all influence with respect to the quantity of the flowing liquid, the freedom or resistance to flow, the temperature, the gradation of color, and the like, inasmuch as factors such as the latter factors will have equal influences on both the carrier liquid without replenishing liquid and the carrier liquid with replenishing liquid, so that such factors will simply cancel themselves out and will have no influence on the accuracy, thus enabling the method and apparatus of the invention to achieve an extremely great uniformity in the thickness and weight of the paper product provided with the method and apparatus of the invention.

It is furthermore to be noted that when the concentration of the liquid streams are detected by the detector, it is completely unnecessary for the light beams to pass through glass tubes or other transparent tubes, since the beams of light are directed only through rectangular slits transversely across the direction of flow of the liquid streams, so that in this way there is no possible detraction from the accuracy of the detection as a result of light-influences from such glass or other transparent tubes.

As was pointed out above, the fan 41 prevents any fogging of the lenses or any deposition of water droplets on the components, which might also have an undesirable effect on the accuracy.

I claim:

1. In a method for manufacturing paper, the steps of continuously recirculating a carrier liquid which carries pulp from which the paper is manufactured, adding to the recirculated carrier liquid a replenishing liquid carrying pulp added with the replenishing liquid to the carrier liquid for replenishing the pulp removed from the carrier liquid during manufacture of the paper, comparing the carrier liquid before replenishing liquid is added thereto with the carrier liquid after replenishing liquid is added thereto, and detecting the deviation, if any, of the relationship between the carrier liquid without replenishing liquid added thereto and the carrier liquid with replenishing liquid added thereto from a predetermined relationship therebetween, and, in accordance with the detected deviation, regulating the rate of supply of the replenishing liquid to the carrier liquid to an extent which will maintain said predetermined relationship, the comparing of the carrier liquid before replenishing liquid is added thereto with the carrier liquid after replenishing liquid is added thereto being brought about by directing a pair of streams of liquid, one of which is the carrier liquid without replenishing liquid added thereto and the other of which is the carrier liquid with the replenishing liquid added thereto, respectively through free unobstructed spaces where the streams are completely exposed and directly accessible, simultaneously directing a pair of controlled light beams transversely through said streams, respectively, to be influenced exclusively by the streams themselves, and comparing said light beams after they have passed through said streams for detecting said deviation, if any.

2. In a method as recited in claim 1 and wherein the regulation of the supply of replenishing liquid to the carrier liquid is brought about by an electrically controlled valve, the steps of deriving from the comparison of said beams after they pass through said streams an electrical signal corresponding to said deviation, if any, and applying said signal to said electrically controlled valve for adjusting the latter to achieve the required regulation of the supply of replenishing liquid to the carrier liquid.

3. In a method as recited in claim 1 and wherein said pair of streams of liquid are directed so as to freely fall in a vertical direction through said spaces where the streams are completely exposed and directly accessible.

4. In an apparatus for manufacturing paper, circulating means for continuously recirculating a carrier liquid carrying pulp from which the paper is manufactured, supply means communicating with said circulating means for supplying to said carrier liquid a replenishing liquid which replenishes the pulp of the carrier liquid, valve means operatively connected with said supply means for controlling the rate at which the replenishing liquid is added to the carrier liquid, a pair of conduit means respectively having inlet ends communicating with said circulating means upstream of the location where said supply means communicates therewith and downstream of the location where said supply means communicates therewith, so that said pair of conduit means respectively receive the carrier liquid before replenishing liquid is added thereto and the carrier liquid after replenishing liquid is added thereto, said pair of conduit means respectively having outlet ends communicating with said circulating means downstream of said location where said supply means communicates therewith so that the liquids from both conduit means are returned to the circulating means, detecting means coacting with said pair of conduit means for detecting the deviation, if any, of the relationship between the liquid in one of the conduit means with the liquid in the other of the conduit means from a predetermined relationship, and control means operatively connected to said detecting means and to said valve means for transmitting to said valve means a control according to the deviation, if any, detected by said detecting means, for automatically regulating said valve means to control the rate of supply of replenishing liquid to the carrier liquid to an extent which will maintain said predetermined relationship, said pair of conduit means respectively having portions providing a pair of free, unobstructed, completely exposed streams of the liquids in said pair of conduit means, respectively, said detecting means coacting with said conduit means for directing through the exposed streams controlled light beams, and said detecting means receiving the latter light beams after they pass respectively through said streams for detecting from the received light beams the deviation, if any, from said predetermined relationship.

5. The combination of claim 4 and wherein said detecting means includes a single light source from which said beams are derived, lenses for participating in the directing of the light beams from the light source through the streams, respectively, light-passage components formed with narrow slits for directing through the streams light beams in the configuration of narrow slits of light, and a pair of light-responsive means situated on the sides of said streams opposite from said light source for receiving the light beams after they pass through the streams and for converting the received light into a pair of electrical signals conforming to the intensity of the light, said control means electrically controlling said valve means and said detecting means transmitting to said control means an electrical signal for automatically regulating said valve means.

6. The combination of claim 5 and wherein said pair of light-responsive means are in the form of a pair of solar batteries.

7. The combination of claim 5 and wherein said pair of light-responsive means are in the form of photoelectric components.

8. The combination of claim 5 and wherein said detecting means includes in the path of one of the light beams an adjustable light-blocking mechanism for controlling the cross-sectional area of said one light beam for determining said predetermined relationship.

9. The combination of claim 8 and wherein said mechanism is an iris mechanism.

10. The combination of claim 4 and wherein said pair of conduit means respectively extend vertically to provide for free falling movement of the pair of exposed streams of the liquids in said pair of conduit means.

References Cited
UNITED STATES PATENTS

| | | | |
|---|---|---|---|
| 3,490,689 | 1/1970 | Hart et al. | 162—252 X |
| 3,589,980 | 6/1971 | Salomon | 162—258 |
| 2,437,715 | 3/1948 | Thorp et al. | 162—258 |

S. LEON BASHORE, Primary Examiner

A. D'ANDREA, JR., Assistant Examiner

U.S. Cl. X.R.

137—92; 162—258, 262, 263